June 26, 1956  F. B. JONES ET AL  2,751,689
DEMONSTRATOR FOR UNDERWATER ECHO
RANGE AND BEARING APPARATUS
Filed Aug. 2, 1945  4 Sheets-Sheet 3

Inventors
OSCAR HUGO SCHUCK
NEIL E. HANDEL
FLOYD BURTON JONES

By Ralph L Chappell
Attorney

United States Patent Office 2,751,689
Patented June 26, 1956

2,751,689

DEMONSTRATOR FOR UNDERWATER ECHO RANGE AND BEARING APPARATUS

Floyd Burton Jones, Austin, Tex., and Oscar Hugo Schuck, Belmont, and Neil E. Handel, Cambridge, Mass., assignors to the United States of America as represented by the Secretary of the Navy Application August 2, 1945, Serial No. 608,586

11 Claims. (Cl. 35—10.4)

This invention relates to a device by which actual operating conditions at sea of a ship installed echo range and bearing system for locating underwater targets may be accurately simulated for purposes of training and demonstration.

In recent years, particularly since the beginning of the present war, methods of echo-ranging have become more and more important in locating underwater craft such as enemy submarines and other underwater objects. The echo-ranging systems vary rather widely in design but in general they comprise an underwater transducer mounted on a rotatable shaft so that sound signals may be sent out and echoes from targets received in any desired direction.

The method of actual manipulation of the various controls in these systems is not difficult but, because several types of visual and sound signals are received in operation of the systems, it has been found that certain human qualities such as tone perception, physiological motor control, intelligence, reaction time, etc., are exceedingly important factors in the successful operation of the system. For these reasons, it is obvious that the training of operators is of great importance.

It is obviously not feasible to train all operators entirely under actual conditions at sea because such operations require a complete installation of the system including a ship and an actual moving submarine device for the target. Furthermore in time of war, such vessels cannot be easily spared for such use and too, the actual training at sea may prove very dangerous.

It is desirable and therefore a principal object of this invention to provide a novel device which can duplicate or simulate, as accurately as possible, the actual operating conditions found at sea, so that operators can be given at least part of their training safely, simply, and without any considerable expense.

For purposes of convenience, and by way of explaining the operation of a conventional echo range and bearing system, most of its more important functional components have been shown in Figs. 1 and 2 of the drawings to the present application and these will be described in order to effect a clearer understanding of the trainer and demonstrator device to which this invention is directed.

As to the remainder of the various views in the drawings which show a preferred embodiment of the invention.

Figures 1, 2, 10:
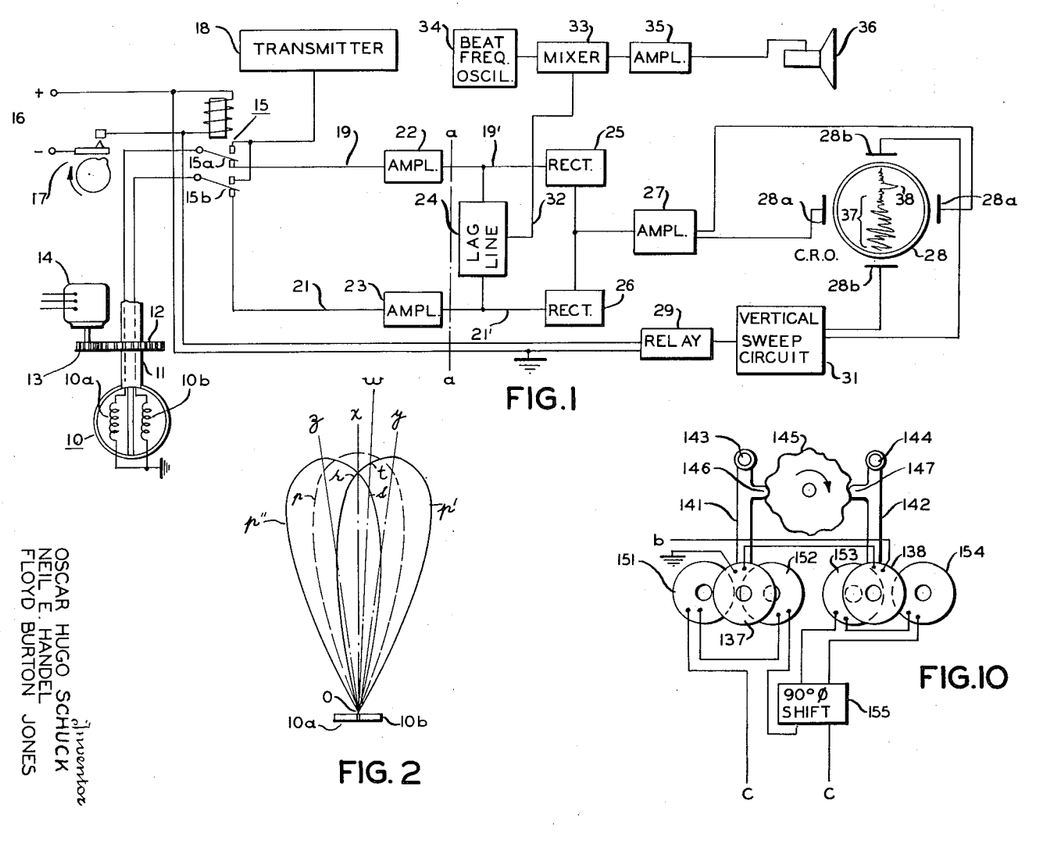
Fig. 10 shows a coil arrangement which may be used as an alternative structure to that shown in Fig. 3 for simulating reverberation.

Referring now to Fig. 1, a directional transducer which is placed underwater and carried by a ship is shown at 10. The transducer may be supported by a shaft 11 which extends through the hull of the ship (not shown) and upon which may be provided a gear 12 which is meshed with pinion 13, the latter being adapted to be driven by means of a motor 14. The direction and amount of rotation of the motor 14 is under the control of the operator and constitutes means by which the transducer 10 may be turned to any particular bearing around the underwater horizon.

The active elements of the transducer 10, which may be either of the piezo-electric or magnetostrictive type, are of conventional constructions and have, accordingly, been shown only schematically. The electrical connections to the elements comprising the left half 10a and those comprising the right half 10b are brought out separately.

A relay 15, the winding of which is energized intermittently from a power source 16 through a timer contactor 17, functions when energized to momentarily connect the output, usually at supersonic frequency, from transmitter oscillator 18 through its contacts 15a, 15b, to the transducer halves 10a and 10b. The electrical energy imparted to the transducer elements, which is a pulse of very short duration, causes a pulse of compressional wave energy to be projected through the water.

In transmitting the pulse, it is seen that the active elements comprising the transducer halves 10a and 10b are connected in parallel and therefore energized simultaneously. The dimensions of transducer 10 relative to the frequency of the transmitter oscillator 18 are such that the pulses projected from each transducer half are additive to produce a resultant pulse which is projected normal to the active face of transducer 10 along an axis Ox shown in Fig. 2. The polar diagram of its transmitting pattern includes a major lobe such as pattern p with its maximum along axis Ox. The pattern for receiving is similarly directional.

Subsequent opening of relay contacts 15a and 15b to the position shown in Fig. 1 terminates pulse transmission and it is seen that these contacts are then so positioned that transducer halves 10a and 10b are connected to separate output circuits 19, 21.

Should the projected pulse strike an underwater target and be reflected, the pulse echo will return to the face of the transducer 10 and mechanically excite the transducer elements to thereby generate electrical forces therein. The voltage output from the elements comprising transducer half 10a feed into output circuit 19 and the output from the elements of transducer 10b similarly feed into circuit 21.

Amplifiers 22, 23 may be provided in the output circuits 10 and 21, respectively, and across the output of these amplifiers is connected a phase shifting network 24 shown in Fig. 1 as a lag line. The function of this network is to delay or shift the phase of the voltage output from one half of transducer 10 relative to that from the other half.

Accordingly, channel 19', to the right of network 24, receives an unshifted signal component from half 10a of transducer 10 and also receives another signal component delayed in phase from the other transducer half 10b via the lag line 24. The resultant of the two signal components in channel 19' is then equivalent to a directional receiving pattern p' (in Fig. 2), the axis of the principal lobe of which is shifted from the perpendicular Ox to axis Oy.

In a like manner, and simultaneously therewith, channel 21', to the right of network 24, receives an unshifted signal component from the transducer half 10b and a phase shifted signal component from the other transducer half 10a via lag line 24.

The resultant of the two signal components in channel 21' to the right of lag line 24 corresponds to directional pattern p'', the axis of which is shifted to the other side of the perpendicular Ox to axis Oz.

As is apparent from Fig. 2, the two channels 19' and 21' to the right of lag line 24 will get equal signals for inputs along axis Ox, the intensity of such currents being equal to vector Or. But with an input from another direction such as axis Ow, the intensity of the signal in channel 19' (pattern p') corresponds to the vector Ot and the intensity of the signal in channel 21' (pattern p''), corresponds to the vector Os. Accordingly, the input to the two channels will differ in intensity for input signals received along axis Ow at one side of the perpendicular axis Ox.

From the foregoing description, it will now be evident that the direction of the incoming target echo pulse relative to the perpendicular (axis Ox) to the transducer 10 may be determined by comparing the resultant signals in channels 19' and 21'. This is done by feeding the respective signals after amplification by equal amounts into rectifier units 25, 26, the latter being so connected that their D. C. outputs oppose each other. The difference between the D. C. outputs of these rectifiers is thus obtained and, after being amplified through an amplifier stage 27 is impressed upon the horizontal deflecting plates 28a of a cathode ray oscilloscope 28 to thereby produce a visual indication of the direction of deviation of target echoes from the bearing to which the projector is trained.

A relay 29, which is energized at the same time and for the same period as relay 15, controls the operation of a vertical sweep circuit 31 and thereby provides for initiating a vertical sweep of the electron beam in oscilloscope 28 each time that an energy pulse is emitted from transducer 10.

The output from the midpoint of lag line 24 is drawn alike from both halves 10a and 10b of transducer 10 and therefore corresponds to directional pattern p in Figure 2 with its axis Ox perpendicular to the face of transducer 10. Accordingly, an output from the midpoint of lag line 24 may be connected via conductor 32 into a mixer stage 33, which, when there combined with the output from a beat frequency oscillator 34, produces audio frequency signals in the mixer output. These signals may be put through amplifier stage 35 and then fed into a loud speaker unit 36 to constitute an aural means for indicating target echoes.

Assuming now that the perpendicular to the transmitting face of transducer 10 when a pulse is transmitted lies along axis Ox, and further assuming that the target pulse echo returns to the transducer along axis Ow, the pattern on the screen of oscilloscope 28 will appear similar to that shown in Fig. 1, wherein left and right deflections of the beam spot due to reverberation (spurious target echoes attributable to various echoes which have their origin in reflections of the transmitted pulse from the sea bottom, the surface of the sea, and the ship's hull) is shown at 37 and deflection to the right of the center due to the subsequently following target pulse echo is shown at 38. This indicates to the operator that the exact bearing of the target relative to the perpendicular to the transmitting face of the transducer is somewhere to the right of this perpendicular Ox.

In a similar manner, should the echo pulse return along some axis on the other side of the perpendicular Ox, the beam spot on the screen of tube 28 would be deflected to the left from the screen center.

In order to obtain the exact bearing of the target reflecting pulse echo 38 relative to the transducer, the operator would adjust the transducer bearing until no deflection of the beam spot due to an echo appears on the screen of the oscilloscope 28. As previously explained, this means that the intensity of the outputs received in both channels 19' and 21' are equal, corresponding to the vector Or in Fig. 2, and hence that the echo pulse is returning to the face of the transducer along its axis. Under these conditions, the exact bearing of the target relative to the transducer 10 is therefore the bearing which is coincident with the perpendicular to the face of the transducer after such adjustment.

The operator is thus furnished with a visual indication on the screen of oscilloscope 28 of the bearing of the target relative to the transducer.

Aural indication of the reverberation and the target pulse echo is furnished over the loud speaker unit 36. By means of the aural indicating means, an operator is able to determine the direction of motion of the target with respect to his own ship. This is done through interpretation of the departure in the frequency of the echo pulse from the reverberation frequency which is caused by motion of the target through the water and is known as the Doppler effect.

There are two Doppler effect components which must be considered. One of them may be termed "own Doppler" which is due to motion of the ship in the water and, therefore, changes the frequency of the reverberation from that of the transmitted pulse. The other may be termed "target Doppler" which is due to motion of the target in the water and which makes the frequency of the returning pulse echo differ from that of the reverberation. Thus, motion of the underwater target towards the ship in the line of sight with respect to the water will be indicated by a general increase in pitch or frequency of the echo pulse with respect to the reverberation pitch while motion of the target away from the ship will be indicated by a corresponding decrease in the pitch or frequency of the echo pulse.

In the apparatus which has been described, the component parts are so selected that the pitch of the aural indication of a pulse echo, with the ship and target stationary, would be about 800 cycles. Now, if the ship is in motion, the reverberation as it comes over the loud speaker will not be a sound of a pure frequency but rather a sound which is made up of a number of irregular different frequencies of fluctuating phase and intensity. At first the sound is of high intensity but it declines during the next one or two seconds, finally disappearing altogether. At some time after the reverberation begins, and assuming that there is a target within range, the echo is heard, but its pitch will be above or below 800 cycles depending upon the nature and extent of the Doppler effect. Furthermore, in general, the longer the interval from the beginning of the reverberation to the echo, the fainter is the echo.

As stated in the opening paragraphs of this specification, it is the object of the present invention to provide an apparatus which very accurately simulates all of the effects, in proper sequence and magnitude, which take place in the operation of the underwater installed echo range and bearing apparatus which has been described. The apparatus thus produces a signal corresponding to pulse transmission, a signal simulating reverberation modified by "own Doppler," and a signal simulating a target echo pulse which is modified by both the "own Doppler" and "target Doppler" effects. The apparatus also provides for prearranged changes in pulse-echo intervals to simulate changes in target range; it provides prearranged changes in the Doppler effect to simulate changes in range rate; it further provides for effects which simulate those which occur when the bearing of the target relative to the transducer changes; and it also provides for attenuating the signal simulating the target echo-pulse changes with changes in target range.

Figure 3:
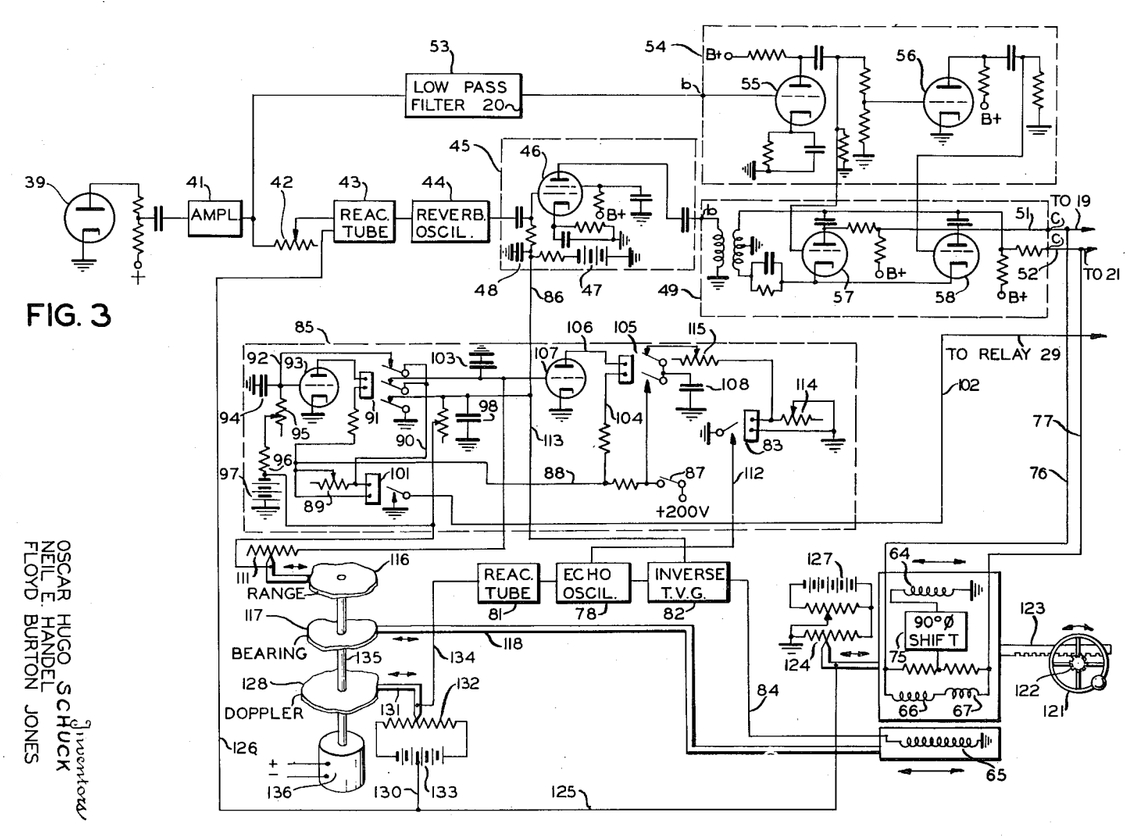
Fig. 3 is a combined schematic and diagrammatic view of the operating elements in the novel trainer.

The preferred embodiment of this invention is shown in Fig. 3 and replaces all parts of the system to the left of line a—a in Fig. 1.

Simulation of reverberation

Referring now to Fig. 3, a signal simulating reverberation is produced from the following component parts. In one form of the invention a gas discharge tube 39 is provided for generating noise currents. These currents are passed through amplifier 41 and then put through a potentiometer 42 onto the grid of a reactance tube 43. The output potential from tube 43 is fed into and as well known, controls the output frequency of a "reverberation" oscillator 44. Oscillator 44 may be adjusted to normally deliver a supersonic frequency about the same as that employed in the actual echo range and bearing apparatus shown in Fig. 1. This may, for example, be 20 kilocycles. But it is seen from Fig. 3 that the frequency determining circuit for oscillator 44 includes reactance tube 43 which in turn is effected irregularly because of its association with the noise tube 39. The result on the output side of oscillator 44 is that the output signal frequency fluctuates irregularly about its normal value of 20 kilocycles.

The output from oscillator 44 is delivered to an inverse time varied gain arrangement by which the simulated reverberation decays with time and which is enclosed within the block 45. In the form shown it includes a tube 46, the grid of which is connected with the output of oscillator 44, a battery 47 and a capacitor 48. Battery 47 charges capacitor 48 negatively and this charge is placed on the grid of tube 46 along with the input to this grid from oscillator 44 with the result that no current can flow in the plate circuit of tube 46 while condenser 48 remains in a negatively charged state. However, by a timing means to be later described, capacitor 48 is discharged periodically to thereby permit current to flow in the plate circuit of tube 46. The discharge from capacitor 48 occurs quickly and thereafter, the current from battery 47 recharges capacitor 48 and gradually again builds up a negative potential on the grid of tube 46. The result of this arrangement is that each time that capacitor 48 is discharged, a high current flows in the plate circuit of tube 46 but this current is cut down gradually as the negative potential on capacitor 48 builds up again.

The output from tube 46 is then fed into a phase modulator shown within the block 49. The function of modulator 49 is to convert the input thereto from single phase to a two phase output, the latter outputs being taken out over conductors 51 and 52 which are adapted to be connected to channels 19 and 21 at points a—a in Fig. 1.

Noise currents on the output side of amplifier 41 are also taken through a low pass filter 53 which may be designed for 20 C. P. S. operation. The output from filter 53 is led into a phase inverter shown within the block 54. Inverter 54 includes a pair of tubes 55 and 56 and the plate circuits of these two tubes are connected respectively onto the grids of tubes 57 and 58 included within the phase modulator 49. Thus noise currents from tube 39 filtered by low pass filter 53 feed into the phase inverter 54 and the effect upon phase modulator 49 is therefore to vary the relative phase of the electromotive forces that are put out by modulator 49 onto the conductors 51 and 52.

To recapitulate, the input to the phase modulator 49 consists of currents corresponding to the output from oscillator 44, its frequency varied by the noise currents tube 39. However, these currents which are normally blocked by the inverse time varied gain 45 are released periodically through the discharge of capacitor 48. At each such release, the currents will flow with high intensity through the phase modulator 49, to the input channels 19 and 21 but are quickly diminished with time as determined by the constants of the charging circuit of capacitor 48. Phase modulator 49 splits the phase of these currents and their relative phase is varied at a random rate according to the low frequency components of the noise source 39 as received through the filter 53 and the phase inverter 54.

Referring now to Fig. 1, it is seen that the two outputs of conductors 51 and 52 from phase modulator 49 of Fig. 3 are each modified by the lag line 24 and the respective resultant outputs produced through action of the lag line 24 are fed into rectifiers 25 and 26 respectively. The difference output after being put through amplifier 27 is then impressed across the horizontal deflecting plates 28a of oscilloscope 28 with the result that each time a vertical sweep of the electron beam is initiated by means to be later described there is seen on the screen of this tube an irregular jogging of the electron beam from the center in a manner which very closely resembles the indications on the screen made by actual reverberation.

In a similar manner, the two outputs from phase modulator 49 are taken from the center of lag line 24 over conductor 32 into mixer 33 and from there fed into loud speaker 36 producing audible signals centering around 800 C. P. S. which simulate very closely those signals which result from actual reverberation. The time varied gain unit 45 functions to properly attenuate the simulated reverberation with time and the "own Doppler" in the reverberation is simulated by the change in frequency in the output of oscillator 44 which results from the action of cam 128 to be later described.

Simulation of target pulse echo

As previously stated with reference to operation of the system shown in Fig. 1, an actual target echo of a pulse emitted from transducer 10 will be subjected to a change in frequency depending upon the total Doppler effect, and its time of reception and intensity will vary with the range. Furthermore, the output potentials produced by the respective halves 10a and 10b of the transducer when the pulse echo returns will vary in intensity and phase with changes in the angle of incidence of the pulse echo relative to the perpendicular to the active face of the transducer. In this apparatus, all of these echo characteristics are simulated most accurately in components which produce an artifically injected echo signal.

However, before discussing each of these components, it will be helpful to consider how the output voltages in the transducer halves 10a and 10b arise and how they vary with the angle of incidence of the echo pulse returning thereto.

Figure 4:
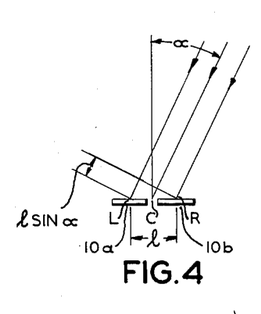
Figs. 4, 12, and 13 show the nature and result of the phase shift in an incoming acoustic energy signal when it strikes a two-part transducer, such as that shown in Fig. 1, at an angle to the perpendicular.
Figure 5:
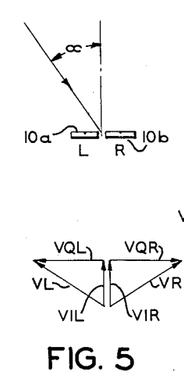
Figs. 5, 14, 15, and 16 show variations in the in-phase and quadrature components of an acoustic energy signal incoming to a two-part transducer at different angles of incidence.
Figure 12:
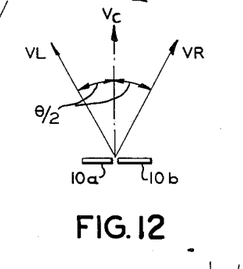
Figure 13:
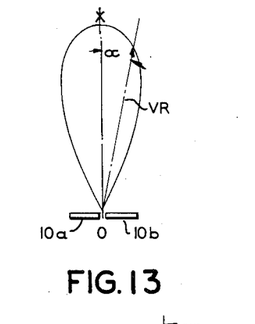
Figure 14:
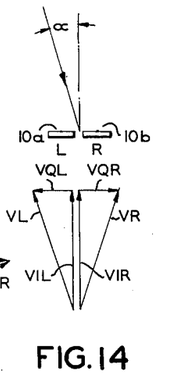
Figure 15:
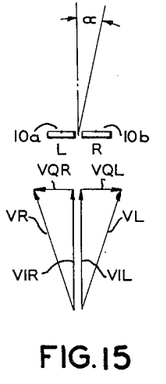
Figure 16:
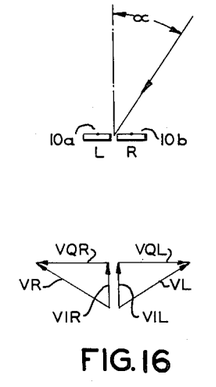

Referring now to Fig. 4, if the pulse echo returns to the center points L and R of the transducer halves 10a and 10b from a direction at an angle α to the perpendicular at C, there will be a phase difference between the sound pressures at the two points. There will be a corresponding phase difference between the voltages generated by the two transducer halves. The path length difference equals $l \sin \alpha$ where $l$ is the distance between the centers of the transducer halves, and the phase difference $\theta$ equals $(l/\lambda)$ 180 $\sin \alpha$ degrees, where $\lambda$ is the wave length of the energy in the transmitting medium. Taking as a reference phase VC that of a transducer located at the midpoint of the line joining R and L, it is seen from Fig. 12 that the phase of the voltage VR generated in 10b (for sound coming from the right) leads that of VC by $\theta/2$ and that VL lags VC by $\theta/2$. However, because of the features of the transducer 10 which give it its directional characteristics, the amplitudes of VL and VR will vary with the angle α. The directivity pattern in Fig. 12 shows how the length of VR or VL varies with α.

The resultant vectors VL and VR, which represent the voltages generated in the respective transducer halves 10a and 10b, may each be resolved into vectors which are respectively in phase with the vector VC (which has the phase of a point transducer at the midpoint of the transducer 10) and in quadrature with this vector. These component vectors shown in Figs. 5, 14, 15 and 16 inclusive are labeled VIR and VQR for the in-phase and quadrature components of VR, and VIL and VQL for the in-phase and quadrature components of VL. It is seen that the in-phase components VIR and VIL are equal in magnitude and phase while the quadrature components VQR and VQL are equal in magnitude but opposite in phase. Also it is clearly seen in Figs. 5, 14, 15 and 16 how the magnitude and relative phase of VR and VL change with the angle of incidence of the echo pulse (angle α).

Figure 6:
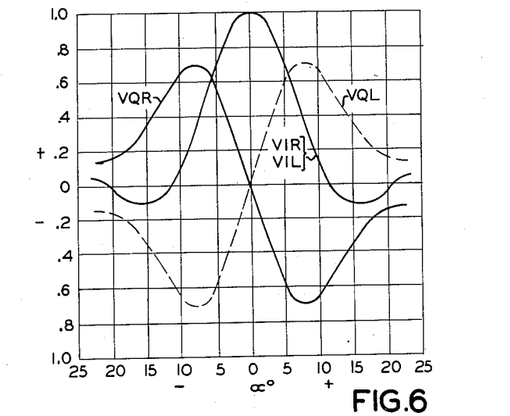
Fig. 6 are curve plots of the variations shown in Figs. 5, 14, 15 and 16 for changes in the angle of incidence from 0° to 25° clockwise and from 0° to 25° counter-clockwise.

Referring now to Fig. 6 the graph there shown indicates a typical variation in magnitude of VIR and VIL, and of VQR and VQL as functions of α. Here α is considered positive if clockwise and negative if counterclockwise. For VIR and VLI, positive phase (upward) is the phase of VC. For VQR and VQL, positive phase is to the right in Figs. 5, 14, 15 and 16. Negative values indicate phase reversal with respect to the reference.

Figure 7:
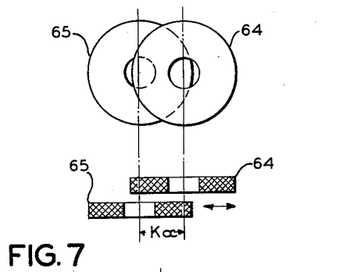
Fig. 7 shows a pair of coils.

In order to artifically produce voltages which vary in accordance with the curves shown in Fig. 6, this invention utilizes coils which are moved relative to each other to vary their mutual inductance. Variation of mutual inductance with displacement furnishes a peculiarly convenient method for producing the required voltages. In Fig. 7 there are shown there two flat cylinder like coils 64 and 65. Assuming coil 64 to be stationary and coil 65 movable transversely with Kα equal to the instant distance between coil centers, the general form of the mutual inductance curve is shown in Fig. 17.

Figure 17:
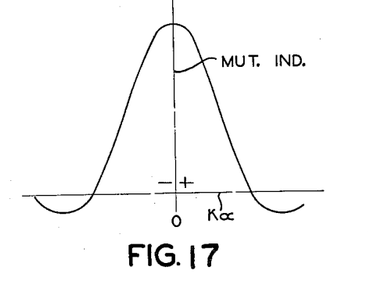
Fig. 17 shows the mutual inductance between the two coils as one of them is moved relative to the other.

It will now be observed that the mutual inductance curve in Fig. 17 approximates very closely the general form of the required curve for VIR and VIL in Fig. 6. There is even a phase reversal on each side of the main "lobe." Absence of the successive reversals shown in Fig. 6 is unimportant, as the amplitudes involved are relatively quite small. The exact form of the mutual inductance curve can be controlled by proper choice of the dimensions of the coils 64 and 65 and of their axial spacing. In the present embodiment, one coil is supplied with current of signal frequency from a constant current source; the voltage induced in the other coil will therefore be directly proportional to the mutual inductance, and will vary with Kα in precisely the same way as does the mutual inductance. In this manner, in-phase voltages corresponding to VIR and VIL in Fig. 6 are produced.

Figure 8:
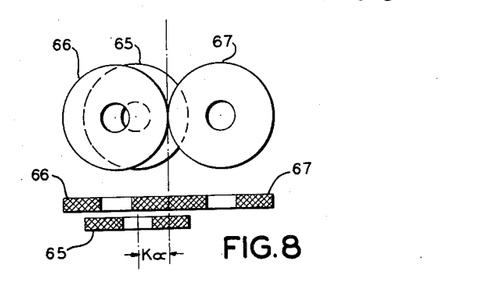
Fig. 8 shows a different coil arrangement.
Figure 18:
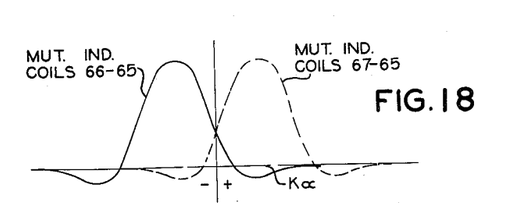
Fig. 18 shows the mutual inductance between the coils as two of them are moved as a unit relative to the third.
Figure 19:
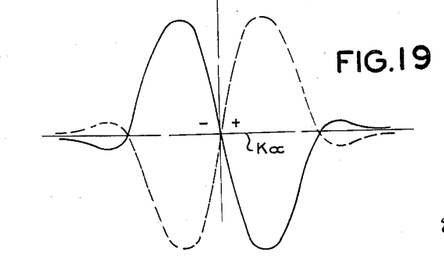
Fig. 19 are curves showing the algebraic sum of the curves in Fig. 18.

Use is also made of the variation of mutual inductance of two coupled coils when displaced relative to each other in producing quadrature voltages having the form shown by curves VQL and VQR in Fig. 6. The requirement of an amplitude zero when Kα is zero, and a phase reversal with changes in sign of Kα are met by using two pick-up coils 66, 67 connected in electrical opposition to each other which move as a unit with respect to a single exciter coil 65 as shown in Fig. 8. The curve for mutual inductance between coils 66—65, and coils 67—65, or for induced voltage with constant current excitation takes the same form of that shown in Fig. 17. This is shown in Fig. 18 there being a separate curve, appropriately displaced in Kα and with proper phase indication, for each coil. The resultant curve representing their difference and shown by the solid line in Fig. 19 is seen to have the same general form as the curve for VQR in Fig. 6 except that there is a reversal of phase beyond the main "lobe." This reversal is unimportant however as the amplitudes involved are relatively small. The dashed-line curve in Fig. 19 to simulate VQL is obtained by reversing connections to both pick-up coils 66 and 67. The exact forms of these curves can be controlled by proper choice of dimensions of the coils 65, 66, 67 and of their axial spacing.

Figure 9:
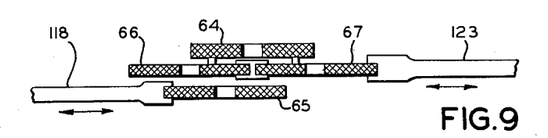
Figs. 9 and 20 show still another coil arrangement, this one being that utilized in this invention to simulate the effect which takes place in a two-part transducer like that shown at 10 in Fig. 1 when the face of the transducer is turned relative to the direction of the incoming wave energy.
Figure 20:
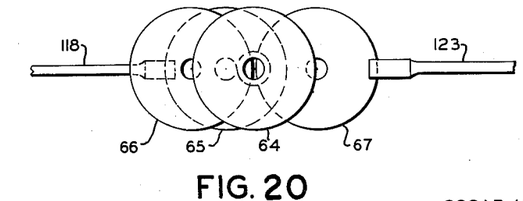

It should now be apparent that the in-phase and quadrature voltage components required to properly simulate pulse echoes can be obtained by combining the coil arrangements of Figs. 7 and 8 into the arrangement shown in Fig. 9 and Fig. 20 wherein coil 65 periodically energized from means to be later described in simulation of a returning echo, is the exciter coil, coil 64 produces the in-phase voltage components VIR and VIL, and coils 66, 67 fixed to each other and to coil 64 produce the quadrature components VQL and VQR. Coils 66—67 are connected in series opposition and are preferably designed to give twice the voltage VQR and VQL indicated by the curves in Fig. 6, but other ratios may be used depending on the transducer it is desired to simulate. Of course it is recognized that up to this point, the quadrature voltage components produced in coils 66 and 67 are actually in phase with that generated in the in-phase coil 64. Therefore before combining the voltages from coils 66—67 with that from coil 64, the phase of the former relative to the latter must be shifted by 90°. This may be done conveniently by a lag line 75 which together with a schematic representation of coils 64, 65, 66, and 67 is shown in Fig. 3.

The two resultant output potentials produced each time coil 65 is excited, i. e. the output potential from coils 64 and 66, and that from coils 64 and 67, are fed over conductors 76 and 77 to conductors 51 and 52 respectively. These two resultant output potentials, simulating the echo signal as produced by the two transducer halves 10a and 10b are thus taken over channels 19' and 21' after being combined with each other through lag line 24. Their electrical difference is obtained in rectifiers 25, 26 and this latter quantity functions to jog the cathode beam in the oscilloscope 28 either to the right as at 38 or to the left on the oscilloscope screen in a very accurate simulation of the effect produced by an actual pulse echo when returning at bearings other than along the perpendicular Ox.

At the same time, the above mentioned resultant potentials feed from the center of lag line 24 over conductor 32 into mixer 33. There they are mixed with the output from oscillator 34 to produce an audio frequency signal which is applied to amplifier 35 and then fed into loudspeaker unit 36. An operator will therefore hear the signals simulating a target pulse echo over speaker 36 simultaneously with viewing it on the screen of oscilloscope 28. In this embodiment, when the quadrature coils 66 and 67 are centered with respect to coil 65, the position shown in Fig. 3, the effect on the resultant outputs over conductors 76 and 77 is such that the electrical difference between the signals in channels 19' and 21' at the outputs of rectifiers 25 and 26 is zero. Consequently the beam spot on the screen will not be deflected to either side of its center path. This then is a simulation of the indication to the operator that the target echo is returning along the perpendicular Ox to the hypothetical transducer which is the condition he strives to maintain. However, when coils 66 and 67 are not so centered, the resultant outputs will produce the condition above referred to and the oscilloscope beam will be jogged accordingly.

Likewise when coils 64, 66, and 67 are centered with respect to coil 65, the induced voltages in the former are at a maximum with the result that the signal simulating a target echo heard over speaker 36 is at maximum level. This level is represented by the curve VIR—VIL of Fig. 6 which is seen to have its maximum when α is zero i. e. when the signal simulating a target echo apparently is returning along the perpendicular to the active face of the hypothetical transducer. However, as these coils move off center, the voltages induced therein become less in accordance with the curve VIR—VIL and the signal simulating target echo heard in speaker 36 is correspondingly attenuated in the same way that a real echo would be attenuated when the active face of transducer 10 is turned relative to the direction of the incoming echo.

It has previously been stated that the signal simulating reverberation heard over speaker 36 is of random amplitude and departs at random from the 800 cycles note which represents the frequency of the transmitted pulse prior to beating it in mixer 33 with the output from oscillator 34. The frequency of the signal simulating target echo pulse i. e. the output from conductors 76 and 77 should accordingly be such that when combined with the output from oscillator 34 in mixer 33 it too will be at an audio frequency of 800 cycles plus or minus the amount of Doppler shift therein attributable to the simulation of motion between the hypothetical vessel and hypothetical underwater target. This is accomplished through the use of an "echo" oscillator 78 shown in Fig. 3 to periodically excite coil 65. The normal frequency of the output of oscillator 78 would thus be the same as the normal for the reverberation oscillator 44, i. e. 20 kilocycles. A reactance tube 81 controls the frequency of oscillator 78 and the former is controlled by means to be later described in such a manner as to produce an output frequency from oscillator 78 above or below the normal 20 kilocycles value in accordance with the Doppler effect desired to be simulated.

The output from oscillator 78 is also subjected to an inverse time varied gain control 82 which has been illustrated in block form only since it is of the same construction as that shown within block 45 and associated with the output from the reverberation oscillator 44. The function of the inverse gain unit 82 is to so attenuate the output from oscillator 78 with time that signals simulating target echoes from targets at close ranges will be stronger than those in simulation of targets assumed to be at relatively greater ranges. Thus the signal simulating target echo is attenuated with range as is the real target echo when the complete echo range and bearing system is used.

The output from echo oscillator 78 is normally inhibited but is periodically released by operation of a relay 83, to be later described, into the time varied gain 82 and thence over conductor 84 into the exciter coil 65 previously described. This periodic excitation of coil 65 induces the voltages into coils 64, 66, and 67 which then carry the signal over conductors 76, 77, and ultimately to the screen of oscilloscope 28 and speaker 36.

*Simulation of pulse transmission and range*

From the previous description of the operation of the echo range and bearing system shown in Fig. 1, it was seen that reverberation begins simultaneously with termination of each pulse transmitted. Thus in this training apparatus each occurrence of the signal simulating reverberation will be indicative of a simulation of the transmission of a pulse. By varying the period between successive signals simulating reverberation occurrences, an operator may therefore simulate changes in the repetition rate of the pulse transmission.

As the velocity of an actually emitted compressional wave pulse in water is substantially constant, target range is proportional to the time required for the pulse to reach the target and return to the transducer. Thus in this particular training apparatus, different target ranges may be simulated by varying the time interval between the operation of the reverberation and echo oscillators 44 and 78, respectively.

The components for controlling the above two periods are enclosed within block 85. As to the relays shown within this block, the convention is observed that with relay coils in a de-energized state, their armatures are in the up position as shown.

As already explained, while battery 47 and capacitor 48 are holding a negative potential on the grid of amplifier 46, the output from reverberation oscillator 44 is blocked. However, as will be presently explained, operation of relay apparatus within block 85 functions to permit capacitor 48 to discharge to ground via conductor 86 and thereby unblock tube 46 allowing the output from oscillator 44 to pass into phase modulator 49.

A control switch is designated by numeral 87. When this switch is closed, a positive voltage obtained from any convenient source such as the terminal labeled +200 v., is applied over conductor 88, potentiometer 89, conductor 90, through the top contact set of a relay 91 and conductor 92 to the grid of a tube 93. This positive voltage replaces the negative voltage which had theretofore been applied to the grid of tube 93 by means of a capacitor 94 and its charging circuit consisting of potentiometer 95, fixed resistor 96 and battery 97 with the result that the current in the plate circuit of tube 93 is increased to the point where the coil of relay 91 is sufficiently energized to pull in its contacts to the position opposite that shown in the drawing, i. e., the circuits through the three relay contact sets are opened.

When the top set of conacts of relay 91 open, it is seen that the positive voltage from the +200 volts source is cut off from capacitor 94. Thereupon this capacitor will charge negatively and comparatively slowly, due to resistors 95 and 96, from battery 97 until the grid of tube 93 eventually becomes negative enough to so reduce the current through relay 91 that it is no longer able to hold in its armatures. Hence, the contacts go back to the position shown in the drawing. However, when the top set of contacts of relay 91 close, the positive potential is again applied to the grid of tube 93 driving it positive and increasing the flow of current in its plate circuit to again energize the coil of relay 91 whereupon the top set of contacts of this relay again open. It is thus seen that the contact sets of relay 91 open and close periodically in a cycle, the repetition rate of which may be varied by adjusting the potentiometer 95 which controls the charging rate for capacitor 94. Thus with the switch 87 closed, the contact sets controlled by relay 91 are open most of the time but close momentarily and periodically in a cyclic operation, the period of which is determined by the charging rate of capacitor 94.

When relay 91 becomes deenergized to the extent where its sets of contacts close, it is seen that closure of the contacts in the lowermost set provides a discharge path to ground from a capacitor 98 and that a like discharge path to ground is furnished for the substantially instantaneous discharge of capacitor 48 in the time varied gain unit 45 associated with the output of the reverberation oscillator 44. As previously described, discharge of capacitor 48 removes the negative potential which had been applied to the grid of amplifier 46 with the result that the output from oscillator 44 is fed through to phase modulator 49 and from the two output circuits of this modulator over conductors 51 and 52 into the channels 19 and 21 shown in Fig. 1. Thus the simulation of reverberation which is indicative of pulse transmission is heard over the loudspeaker 36 and also viewed upon the screen of the oscilloscope 28 as previously described.

When the contact sets of relay 91 open again as the relay coil becomes more energized, capacitors 98 and 48 again charge up negatively from battery 47 until the next operation of the contacts of relay 91, and this cycle of operation repeats.

At the time that the coil of relay 91 is deenergized sufficiently to permit closure of contacts in the top set of relay 91, the current from the positive 200 volt source that reverses the charge on the capacitor 94 also flows through a relay 101 causing the contacts in its single contact set to cose for a very brief period. The temporary closure of the contacts on this relay serve to complete over conductor 102 the circuit for energizing relay 29 shown in Fig. 1 which, as previously described, initiates the vertical sweep of the cathode beam in the oscilloscope 28. It is thus seen that with each operation of relay 91 at which time the signal simulating reverberation is started through the apparatus, a vertical sweep of the electron beam in the oscilloscope 28 is initiated. This action is thus the same that takes place in operation of the actual echo range and bearing equipment at the time an energy pulse is emitted from the transducer 10.

Immediately after the relay 91 reenergizes and opens the contacts of the top contact set of this relay, a capacitor 103 is positively charged from the 200 v. source. Current from the +200 volt source is also being fed over conductor 104 through the energizing coil of another relay 105 and through conductor 106 to the plate of another tube 107. Also at this time, still another capacitor 108 is being held charged from the +200 volt source since the contacts in the lower set of relay 105 will now be closed. A charging current now flows from battery 97 through potentiometer 111 to capacitor 103 thereby building up a negative potential on the grid of tube 107.

At a time determined by the adjustment of the potentiometer 111, current in the plate circuit of tube 107 is cut down to a value such that relay 105 releases, at which time capacitor 108 is cut off from the +200 volt source and connected to discharge through the energizing winding of relay 83 previously referred to. A single set of contacts of this latter relay then close and complete a circuit over conductor 112 to ground initiating the 20 kilocycles output from echo oscillator 78. The output of the oscillator 78 is connected to the inverse time varied gain unit 82 which is similar to the time varied gain unit 45. This unit determines the amplitude of the oscillator pulse which is allowed to flow into the exciter coil 65 over conductor 84. As previously described, the 20 kilocycles current through coil 65 produces in coils 64, 66, and 67 the electrical signal which corresponds to the real target pulse echo. Its duration may be adjusted by potentiometers 114 and 115 in the timing unit 85.

The time interval from the simulation of pulse emission to the simulation of returning echo corresponds to the range in normal practice. Such interval is controlled in this trainer apparatus by the adjustment of the potentiometer 111, which in turn is controlled by a range cam 116.

*Simulation of change in target bearing*

As previously explained, when the transducer 10 is facing directly towards the source of the echo energy reflections, i. e., when the echo is returning from a bearing coincident with the perpendicular Ox to the face of the transducer shown in Fig. 2, the signals produced in each of the transducer halves 10a and 10b are of like characteristic. When these are put through channels 19 and 21 and compared, their difference is zero and there is accordingly no deflection of the electron beam on the screen of the oscilloscope 28. However, as has already been pointed out, when the pulse echo is returning to the face of the transducer at an angle from the perpendicular Ox, the effect on the screen of the oscilloscope 28 is that the electron beam is jogged to the right or to the left as the case may be depending upon which side of the perpendicular Ox, the echo is returning. It has already been explained that the change in characteristic of the echo signals which are fed into channels 19 and 21 from the transducer halves 10a and 10b when the latter are so positioned that the echo pulse returns along an axis other than the perpendicular axis Ox may be simulated most accurately by the arrangement of the coils 64, 65, 66, and 67. With coil 65 centered with respect to coils 64, 66, and 67 as shown schematically in Fig. 3, the effect upon the signal output simulating target echo which passes over conductors 76 and 77 and ultimately into channels 19 and 21 is the same as though the real target echo pulse were returning along axis Ox. However, when coil 65 and coils 64, 66, and 67, which latter three are fixed together, are caused to move relative to each other, the effect is to simulate a change in direction of the incoming target echo pulse relative to the perpendicular axis Ox of a transducer. Thus in order to create changes in bearing of a hypothetical target relative to a hypothetical transducer, a bearing cam 117 is provided. A cam follower 118 moves transversely in accordance with the contour of the bearing cam 117 and transmits similar motion to the exciter coil 65. Thus assuming that coils 64, 66, and 67 are stationary, it is seen that motion of coil 65 either to the right or to the left from the central position shown in Fig. 3 will so change the characteristic of the signal pulse which is fed out over conductors 76 and 77 that a jog will be produced in the beam of the oscilloscope 28 as it sweeps vertically upward. Since this indicates to the operator that the axis Ox of the hypothetical transducer is off the target bearing, he can by means of a hand wheel 121 and the associate pinion 122 and rack gear 123 readjust the position of coils 64, 66, and 67 so that these again take the position shown in Fig. 3.

Figure 11:
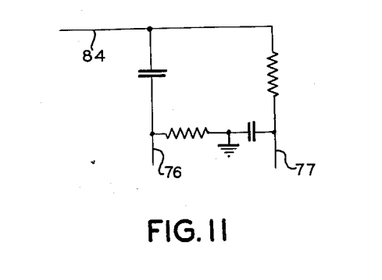
Fig. 11 shows a circuit which may be used as an alternative arrangement to that shown in Figs. 9 and 20.

For demonstration and test purposes it is frequently sufficient to introduce a fixed phase shift into the system rather than the variable phase shift derived from the coils 64, 65, 66, and 67. In this case the coils may be replaced by a simple invariable R-C network as shown in Fig. 11 which shifts the phase of the signal applied to the network so that the phase of the output potential in line 77 leads that of the potential in line 76 by a predetermined constant amount.

*Simulation of change in Doppler effect*

As previously explained in connection with the operation of the echo range and bearing system shown in Fig. 1, there are two Doppler shifts which must be considered, first, that arising by reason of the motion of the ship on which the system is mounted and secondly, that arising by reason of motion of the target. These were referred to as the "own Doppler" and "target Doppler" respectively. The reverberation as explained contains only the "own Doppler" component but the echo is affected by both components.

It will be appreciated that with normal operation of an actual echo range and bearing system, the Doppler shift in the reverberation is due, not to the full forward speed of the ship upon which the system is mounted but only to that component in the direction in which the transducer 10 is trained. If the transducer is trained dead ahead or dead astern of the ship, the "own Doppler" effect, of course, will be at a maximum while if the transducer is trained on the beam, the "own Doppler" effect will be zero. The "own Doppler" effect is therefore proportional to the cosine of the training angle of the transducer 10 relative to the fore and aft axis of the ship.

As previously explained, the handwheel 121 is provided for operation to simulate training of a hypothetical transducer. Not only does it adjust the coils 64, 66, and 67 relative to coil 65 but it also adjusts a cosine potentiometer 124 which is interposed in the circuit which branches through conductors 125 and 126. Cosine potentiometer 124 is designed according to its name so that a potential from battery 127 varying as the cosine of the angle of rotation of handwheel 121 is applied over conductors 125 and 126 to the input of reactance tube 43 and superimposes the correct amount of "own Doppler" shift on the normal output frequency of the reverberation oscillator 44 according to the component of the ship's speed in the direction in which the transducer is trained as such training is simulated by operation of the handwheel 121.

To introduce into the simulation of a target echo pulse the Doppler shift of frequency caused by motion of the ship on which the echo range and bearing system is mounted as well as motion of the underwater target such as an enemy submarine in simulation of motion of the target toward or away from the ship, a Doppler cam 128 is provided through which a cam follower 131 operates a potentiometer 132. Thus the voltage from battery 133 acting through potentiometer 132 introduces a control on the reactance tube 81 which in turn effects a similar change in the output frequency of the echo oscillator 78 in accordance with the hypothetical movement of the target. In order to insert a Doppler shift component into the simulation of a target echo signal in accordance with the hypothetical motion of the ship, a tap is made from battery 133 over conductor 130 to conductor 125 to thereby pick up the output from cosine potentiometer 124. Thus reactance tube 81 is affected by the outputs from both of the potentiometers 124 and 132. The contour of the Doppler cam 128 of course will bear a proper relationship to the contour of the range cam 116 to allow for the assumed relative speeds and bearing of the target and ship.

Range cam 116, bearing cam 117 and Doppler cam 128 are all mounted on a shaft 135 which is rotated slowly by a motor 136.

Any suitable device may be used to vary the effect of the reactance tube 81 on its oscillator circuit. In the form shown, this variation is accomplished by changing the applied potential to the grid of the reactance tube. However, an equally facile and operative arrangement may include means to alter the coupling between the reactance tube and its oscillator 78, leaving the potential applied to the tube constant.

It is apparent that under certain conditions of operation of the training device in which it is desired to simulate instances in which the reverberation has so completely died away by the time an echo is received or an echo may so exceed the instant reverberation level the simulator may be constructed in which a single oscillator may be used to replace oscillators 44 and 78. The frequency of the oscillator output is, of course, controllable as above stated by controlling the reactance tube with which the oscillator is associated.

*Alternative means for simulating reverberation*

Inasmuch as reverberation consists of waves of random frequency centering about the transmitted frequency and contains random shifts in phase and amplitude, its effect can also be closely simulated by replacing the phase inverter 54 and phase modulator 49 by the device shown in Fig. 10. Connection in the circuit with the remaining elements is made at points lower than *b* and *c—c* in Fig. 3.

As shown in Fig. 10, a pair of exciter coils 137, 138 are provided. These coils are connected together in series opposition and are mounted respectively upon arms 141, 142 which are pivoted at points 143 and 144 respectively. An irregularly cut cam 145 is rotated by suitable means about its center and engages at opposite sides thereof cam followers 146 and 147 which form a part of the arms 141 and 142, respectively. Inductively coupled with coil 137 are a pair of fixed coils 151 and 152 which are so wound and connected that their induced voltages oppose each other. Similar coils 153 and 154 are associated with coil 138. A 90° phase shifting device 155, which may be a lag line, is connected in circuit with the four coils 151, 152, 153, and 154. In operation, with the irregular cut cam 145 rotating, the corresponding irregular motion of coils 137 and 138 induces voltages into the coils 151, 152, 153, and 154 which when combined with each other and passed through the phase shifter 155 produce at the output terminals *c—c* a two-phase output quite similar to that derived through use of the phase modultaor 49 and phase inverter 53 shown in Fig. 3. The coils in Fig. 10 are preferably similar in construction to those shown in Fig. 9.

If a pure tone can be tolerated in the system, that is, if the device can be used without the modulated reverberation, the devices just described and the noise tube 39 may be eliminated.

In conclusion it will be evident that this invention provides a simple and low cost means for training operators in the use of underwater echo range and bearing systems.

Furthermore, it is to be understood that while the embodiment which has been described is to be preferred, changes in the construction and arrangement of the component parts may be made without departing from the spirit and scope of the invention as defined by the appended claims.

What is claimed is:

1. In a trainer for simulating operation of a ship-installed system in which a target is located by transmitting an energy pulse from a transducer and receiving an echo thereof from said target, the combination comprising an indicator, a signal generator including an oscillator, an inverse time varied gain unit for attenuating the oscillator output, means to key said oscillator at a predetermined time, circuit means connecting the attenuated oscillator output to said indicator, means for varying the frequency of the oscillator output above and below its normal value to simulate the Doppler shift of frequency caused by motion of said target, said last-mentioned means including a cam, a cam follower and means controled by said cam follower for changing the oscillator frequency.

2. In a trainer for simulating operation of a ship-installed system in which a target is located by transmitting an energy pulse from a tranducer and receiving an echo thereof from said target, the combination comprising an indicator, a signal generator including an oscillator, an inverse time varied gain unit for attenuating the oscillator output, means to key said oscillator at a predetermined time, circuit means connecting the attenuated oscillator output to said indicator, means for varying the frequency of the oscillator output above and below its normal value to simulate the Doppler shift of frequency caused by motion of said target, said last-mentioned means including a cam, a cam follower, a potentiometer controlled by said cam follower, a reactance connected in circuit with said oscillator for controlling the frequency of the latter and circuit means connecting the potentiometer output to said reactance.

3. In a device for simulating operation of a system in which an underwater target is located by transmitting an energy pulse underwater from a transducer and receiving an echo thereof from said target, the combination comprising an indicator, a signal generator including an oscillator, means for attenuating the oscillator output to simulate a change in target bearing, said last means including a cam, a cam follower, an exciter coil movable by said cam follower, circuit means connecting the attenuated oscillator output to said exciter coil, a pick-up coil inductively coupled with said exciter coil, circuit means connecting said pick-up coil to said indicator, and manually operated means for adjusting the position of said pick-up coil relative to said exciter coil to counteract the change in mutual inductance therebetween as said exciter coil is moved.

4. In a trainer device for simulating the operation of a system in which an underwater target is located by transmitting an energy pulse under water from a transducer and receiving an echo thereof from said target, the combination comprising an indicator, a first signal generator including an oscillator, a noise source for varying the frequency of said oscillator at random and an inverse time varied gain unit for attenuating the output of said oscillator in simulation of reverberation characteristics, a second signal generator including a second oscillator and an inverse time varied gain unit for attenuating the output of said second oscillator in simulation of target echoes, circuit means connecting the attenuated outputs of said first and second oscillators to said indicator, means for obtaining periodic operation of said oscillators to simulate on said indicator the reverberation of a transmitted pulse followed by the target echo pulse, and means for varying the time interval between the operation of said oscillators to simulate a change in target range, said last-mentioned means including a cam, a cam follower and a potentiometer, the adjustment of which is controlled by said cam follower.

5. In a trainer device for simulating operation of a system in which an underwater target is located by transmitting an energy pulse underwater from a transducer and receiving an echo thereof from said target, the combination comprising; a first signal generator to simulate reverberation echoes including a first oscillator, a noise source for varying the output frequency of said oscillator at random and an inverse time varied gain unit for attenuating the output of said oscillator; a second signal generator to simulate target echoes including a second oscillator, cam controlled means for varying the output frequency of said second oscillator to simulate a Doppler shift of frequency of target echoes, an inverse time varied gain unit for attenuating said second oscillator output and cam controlled means for also attenuating said second oscillator output to simulate a change in target bearing; an indicator; circuit means connecting the attenuated outputs of said oscillators to said indicator; means obtaining periodic operation of said oscillators to simulate on said indicator the reverberation of a transmitted pulse followed by the target echo pulse; cam controlled means for varying the time interval between the operation of said oscillators to simulate a change in target range; and manually controlled means simulating a bearing control for said transducer to offset the effect of said cam controlled second oscillator attenuating means.

6. In a trainer device for simulating operation of a system in which an underwater target is located by transmitting an energy pulse underwater from a transducer and receiving an echo thereof from said target, the combination comprising; an indicator; a first signal generator for the simulation of reverberation echoes including an oscillator, a noise source for varying the output frequency of said oscillator at dandom, an inverse time varied gain unit for attenuating the output of said oscillator and circuit means connecting the attenuated oscillator output to said indicator; a second signal generator in simulation of target echoes including a second oscillator, cam controlled means for varying the output frequency of said second oscillator to simulate a Doppler shift of frequency of target echoes, an inverse time varied gain unit for attenuating the output of said second oscillator, means for also attenuating the output of said second oscillator to simulate a change in target bearing, last said means including a cam, a cam follower, an exciter coil movable with said cam follower, circuit means connecting the attenuated second oscillator output to said exciter coil, a pick-up coil inductively coupled with said exciter coil, circuit means connecting said pick-up coil to said indicator and manually operated means for adjusting the position of said pick-up coil relative to said exciter coil to counteract the change in mutual inductance therebetween as said exciter coil is moved; means for obtaining periodic operation of said oscillators to simulate on said indicator the reverberation of a transmitted pulse followed by the target echo pulse; and cam controlled means for varying the time interval between the operation of said oscillators to simulate a change in target range.

7. In a trainer device for simulating operation of a system in which an underwater target is located by transmitting an energy pulse underwater from a transducer and receiving an echo thereof from said target, the combination comprising, an indicator, a generator of signals simulating reverberation echoes including an oscillator, a noise source for varying the frequency of the oscillator output at random, an inverse time varied gain unit for attenuating the oscillator output, means feeding the attenuated output of said oscillator into a pair of output channels, means for shifting the phase of the output in one of said channels relative to the other, means for varying at random the phase shift between the outputs in said channels, and circuit means connecting said output channels to said indicator.

8. In a trainer device for simulating operation of a system in which an underwater target is located by transmitting an energy pulse underwater from a transducer and receiving an echo thereof from said target, the combination comprising, an indicator, a generator of signals simulating reverberation echoes including an oscillator, a noise source for varying the frequency of the oscillator output at random, an inverse time varied gain unit for attenuating the oscillator output, means including a cosine potentiometer for varying the frequency of the oscillator output, manually operated means simulating a bearing control for said transducer for controlling the operation of said cosine potentiometer and circuit means connecting the attenuated oscillator output to said indicator.

9. In a trainer device for simulating operation of a system in which an underwater target is located by transmitting an energy pulse underwater from a transducer and receiving an echo thereof from said target, the combination comprising, an indicator, a generator of signals simulating reverberation echoes including an oscillator, a noise source for varying the frequency of the oscillator output at random, an inverse time varied gain unit for attenuating the oscillator output, means for dividing the output of said oscillator into two output channels the signals of which are shifted in phase relative to each other comprising a pair of exciter coils connected in series opposition, said coils being adapted to be connected to the output of said oscillator and to said noise source, a pair of series opposed coils associated with each of said exciter coils and inductively coupled therewith, a phase shifter connected in circuit with said pairs of coils, means including an irregular cam for effecting random transverse motion between each of said exciter coils and the said pair of coils coupled therewith, and circuit means connecting said pairs of coils to said indicator.

10. Means to simulate the operation of an underwater sound transducer of the type divided for obtaining a plurality of directional lobes which comprises, an input coil energized by a signal corresponding to normally receive sounds, means inductively associated with said input coil and comprising an amplitude coil in which said energizing signal induces voltages which vary in amplitude with displacement in essentially the same manner as the in-phase voltage component of an underwater sound transducer when trained across a sound source and in constant predetermined phase relation with the current in said input coil, additional quadrature coils inductively coupled and connected to produce induced voltages from said input coil which vary in amplitude with displacement in essentially the same manner as the quadrature voltage component of an underwater sound transducer when trained across a sound source, means to produce relative movement between said input coil and the remaining coils, and means to combine the output of said quadrature coils and said amplitude coil.

11. Means to simulate the operation of an underwater sound transducer of the type divided for obtaining a plurality of directional lobes which comprises, an input coil energized by a signal corresponding to normally received sounds, means inductively associated with said input coil and comprising, an amplitude coil in which said energizing signal induces voltages which vary in amplitude with displacement in essentially the same manner as the inphase voltage component of an underwater sound transducer when trained across a sound source and in constant predetermined phase relation with the voltage in said input coil, additional coils inductively coupled to said input coil and adapted to produce induced voltages from said input coil which vary in amplitude with displacement in essentially the same manner as the quadrature voltage component of an underwater sound transducer when trained across a sound source, phase shifting means to bring the induced voltages in said last named coils into quadrature relationship with the voltages in said amplitude coil, means to produce relative lateral movement between said input coil and the remaining coils, and combining means to add the outputs of said last named coils and said amplitude coil.

References Cited in the file of this patent

UNITED STATES PATENTS

| | | |
|---|---|---|
| 1,488,310 | Birchfield | Mar. 25, 1924 |
| 1,608,993 | Pfanstiehl | Nov. 30, 1926 |
| 2,524,847 | Springer | Oct. 10, 1950 |